United States Patent [19]

Kakihara et al.

[11] 4,294,706

[45] Oct. 13, 1981

[54] PROCESS FOR TREATING WASTE WATER

[75] Inventors: Naomichi Kakihara; Yoshiaki Harada; Norio Uedono, all of Osaka, Japan

[73] Assignee: Osaka Gas Company, Limited, Osaka, Japan

[21] Appl. No.: 144,696

[22] Filed: Apr. 28, 1980

[30] Foreign Application Priority Data

May 16, 1979 [JP] Japan .................................. 54-60886

[51] Int. Cl.$^3$ .............................................. C02F 1/74
[52] U.S. Cl. .................................... 210/762; 210/903
[58] Field of Search ................ 210/762, 903, 761, 763

[56] References Cited

U.S. PATENT DOCUMENTS 4,141,828  2/1979  Okada et al. ........................ 210/762

Primary Examiner—Thomas G. Wyse
Attorney, Agent, or Firm—Larson and Taylor

[57] ABSTRACT

This invention relates to a process by which waste water containing ammonia or chemically oxidizable substances (hereinafter referred to as "COD components"), suspended solids, etc. in addition to ammonia is subjected to wet oxidation in the presence of a catalyst to convert these pollutants to nitrogen, carbon dioxide, water and the like and to thereby render the waste water harmless.

According to this invention, the ammonia contained in the waste water includes ammonium compounds which liberate ammonium ions when dissociated in water. The COD components include phenol, cyanides, thiocyanates, oils, thiosulfuric acid, sulfurous acid, sulfides, nitrous acid, etc.

12 Claims, 2 Drawing Figures

PROCESS FOR TREATING WASTE WATER

This invention relates to a process by which waste water containing ammonia or chemically oxidizable substances (hereinafter referred to as "COD components"), suspended solids, etc. in addition to ammonia is subjected to wet oxidation in the presence of a catalyst to convert these pollutants to nitrogen, carbon dioxide, water and the like and to thereby render the waste water harmless.

According to this invention, the ammonia contained in the waste water includes ammonium compounds which liberate ammonium ions when dissociated in water. The COD components include phenol, cyanides, thiocyanates, oils, thiosulfuric acid, sulfurous acid, sulfides, nitrous acid, etc.

For the control of water pollution, it is thought necessary in recent years to remove from water nitrogen components (particularly ammonia nitrogen) as well as COD components. The former serves as nutrients contributing chiefly to an abnormal growth of algae in rivers and lakes, occurrence of red tide in the sea, and occurrence of molds in reservoirs which renders municipal water musty. Thus more stringent regulations will be adopted against nitrogen pollutants.

In view of existing techniques for treating ammonia-containing waste water, Harada, one of the present inventors, et al. carried out extensive research to develop a process for treating waste water with ease and with economical feasibility which process is capable of removing ammonia or, ammonia and COD components at the same time irrespective of the concentration of ammonia, and found that the object was achievable by subjecting waste water to wet oxidation reaction in the presence of a specific catalyst and under specified conditions. Based on this finding, the invention of U.S. Pat. No. 4,141,828 was accomplished. (The process disclosed therein will hereinafter be referred to as the "process of the prior invention.") With the process of the prior invention, ammonia-containing waste water can be very effectively treated when subjected to wet oxidation at a pH of at least 9, but the subsequent research revealed that the process still involved some problems when treating some kinds of waste waters. When waste water with a pH of about 9 to about 11.5 is fed to the reactor, the progress of the reaction usually greatly reduces the pH of the reaction system and consequently leads to a reduced harmful component decomposition efficiency, possibly necessitating an increased amount of catalyst and accelerating the consumption or degradation of the catalyst. Acid liquids will cause serious damage to the reactor, piping, heat exchanger, etc. and require neutralization of the effluent before discharge. Depending on the treating condition, the waste water to be treated by the wet oxidation using a reactor of fixed bed, when having a pH of highly alkaline range, could damage the lower portion of the catalyst layer provided in the reactor after the lapse of a certain period of time and could permit the catalyst carrier to dissolve out. The waste water having a pH of higher than 11 could also cause conversion of part of the ammonia therein to nitrite nitrogen and/or nitrate nitrogen, possibly allowing the discharge of the nitrogen from the system along with the treated liquid.

Accordingly, an object of the invention is to provide a process for treating ammonia-containing waste water which exhibits an highly improved efficiency of decomposing harmful components without entailing a great reduction of pH in the reaction system and accelerated consumption or degradation of the catalyst.

Another object of the invention is to provide a process for treating ammonia-containing waste water wherein the reactor, piping, heat exchanger, etc. are substantially free from the damage by the liquid and the neutralization of the effluent is not required.

Still another object of the invention is to provide a process for treating ammonia-containing waste water which can prevent the damage to the catalyst layer and the dissolution of the catalyst carrier even in the presence of a highly akaline liquid.

Still another object of the invention is to provide a process for treating ammonia-containing waste water which is capable of selectively converting ammonia in the waste water into nitrogen gas.

Other objects and features of the invention will become apparent from the following description.

This invention provides a process for treating ammonia-containing waste water which comprises introducing at a pH of about 8.5 to about 11.5 the waste water to a reactor to subject the same to wet oxidation with an oxygen-containing gas in the presence of a catalyst while maintaining the waste water at a temperature of about 100° to about 370° C. and at pressure permitting the waste water to remain in the liquid phase, the oxygen-containing gas containing oxygen in an amount of about 1 to about 1.5 times the theoretical amount required for decomposing the ammonia, organic substances and inorganic substances contained in the waste water, the catalyst being supported by at least one of zirconia and titania and comprising at least one of iron, cobalt, nickel, ruthenium, rhodium, palladium, iridium, platinum, copper, gold, tungsten and compounds thereof insoluble or sparingly soluble in water, and supplying an alkali substance to the reactor at a rate required to maintain at least about 80% of the waste water introduced to the reactor and positioned toward the water inlet of the reactor at a pH of at least about 8 at all times and to permit the water resulting from the wet oxidation to retain a pH of about 5 to about 8.

We have made continued research and found that all the foregoing problems of the process of the prior invention can be overcome by feeding an alkali substance to the wet oxidation reactor at such a rate that at least about 80% of the waste water supplied to the reactor and positioned toward the water inlet of the reactor is maintained at a pH of at least about 8 at all times and that the liquid resulting from the wet oxidation has a pH of about 5 to about 8. Further, we have found that the use of specified carrier and the addition of alkali substance ensure a stable activity of the catalyst over a prolonged period, improving decomposition efficiency of the ammonia-containing waste water and converting substantially all the ammonia contents in the waste water into nitrogen gas and water regardless of the treating conditions. This invention has been accomplished based on these novel findings.

Examples of the waste water to be treated by the present process are those which contain ammonia and which may further contain oxidizable organic and/or inorganic substances, such as gas liquor produced in coke oven plants, coal gasifying plants and coal liquefying plants, waste water from gas cleaning processes employed in these plants, oil-containing waste water, water from activated sludge process, sedimented activated sludge, waste water from chemical plants and oil refineries, municipal effluents, sewage, sewage sludge, etc. Waste water from high-temperature and/or high-pressure systems can be advantageously treated by the present process at a reduced cost for heating and/or pressurizing the waste water. If the waste water contains an excess of suspended solids, the solids will adhere to the components of the treating apparatus, entailing a reduced efficiency such as a reduced heat transfer coefficient on the surface of the heat exchanger or a lower catalytic activity due to the deposition of solids on the surface of particles of the catalyst packed in the reactor. Accordingly, it is preferable to remove suspended solids partly or wholly from the waste water prior to the treatment depending on the concentration and composition of the solids. Alternatively, the waste water may be subjected to a non-catalytic wet oxydation process known as the Zimmermann process to partly or wholly decompose suspended solids prior to the present process and to prevent the poisoning of the catalyst used in the present process. The waste water to be treated by the present process has a pH of about 8.5 to about 11.5 so as to remove COD components and ammonia effectively. More preferable range of the pH is about 9 to about 11. It is therefore desirable to adjust the pH of the waste water before the reaction with an alkali such as sodium hydroxide, calcium hydroxide, sodium carbonate or the like depending on the kind of the waste water.

The alkali substance is introduced into the wet reaction system at the desired time and at a rate required to maintain at least about 80% of the waste water supplied to the reactor and positioned toward the water inlet of the reactor at a pH of at least about 8 at all times and to permit the treated liquid to retain a pH of about 5 to about 8 at all times. The same alkalis as used for the pH adjustment of the waste water are usable as such alkali substances.

Examples of useful active components of catalysts are iron, cobalt, nickel, ruthenium, rhodium, palladium, iridium, platinum, copper, gold and tungsten and compounds of these metals which are insoluble or sparingly soluble in water. These components are used singly, or at least two of them are conjointly usable. Examples of useful compounds which are insoluble or sparingly soluble in water are:

(i) Oxides such as iron sesquioxide, tri-iron tetroxide, cobalt monoxide, nickel monoxide, ruthenium dioxide, rhodium sesquioxide, palladium monoxide, iridium dioxide, cupric oxide, tungsten dioxide, etc.

(ii) Chlorides such as ruthenium dichloride, platinum dichloride, etc.

(iii) Sulfides such as ruthenium sulfide, rhodium sulfide, etc.

etc. These metals and compounds thereof are used as supported in the usual manner by titania and/or zirconia. Titania and/or zirconia will be effectively prevented from dissolving out even at a pH of higher than 11, while inhibiting the conversion of ammonia to nitrite nitrogen and/or nitrate nitrogen and greatly improving the harmful component decomposition efficiency. The amount of the active component to be supported by the carrier is about 0.05 to about 25%, preferably about 0.5 to about 3%, based on the weight of the carrier. The catalyst can be used in the form of globules, pellets, cylinders, crushed fragments, particles or in any other desired form. When the reactor is adapted for a fixed bed, the waste water is passed therethrough preferably at a space velocity of about 0.5 to about 10 hr$^{-1}$, more preferably at about 1 to about 5 hr$^{-1}$, based on an empty column. The grains or pieces of the supported catalyst useful for the fixed bed is usually about 3 to about 50 mm, preferably about 5 to about 25 mm in size. In the case of fluidized beds, it is preferable to use the supported catalyst as suspended in the waste water like a slurry in such an amount that it will form a fluidized bed within the reactor, namely in an amount of usually about 0.1 to about 20% by weight, more preferably about 0.5 to about 10% by weight, based on the resulting suspension. For the actual operation with the fluidized bed, it is preferable to feed the supported catalyst to the reactor as suspended in the waste water, separate the catalyst from the treated water resulting from the reaction by sedimentation, centrifuging or like suitable method and reuse the separated catalyst again. To facilitate like separation of the catalyst from the treated water, therefore, the supported catalyst useful for the fluidized bed is advantageously about 0.15 to about 0.5 mm in particle size.

Examples of useful oxygen-containing gases are air, oxygen-enriched air, oxygen, oxygen-containing waste gases, etc. By the oxygen-containing waste gases are meant those having a lower oxygen concentration than air and containing one or more of hydrogen cyanide, hydrogen sulfide, ammonia, sulfur dioxide, organic sulfur compounds, nitrogen oxides, hydrocarbons, etc., such as a waste gas from the regenerator of the redox desulfurization process. The use of such oxygen-containing waste gases is advantageous in that the harmful components of the gas can be rendered harmless along with those contained in the waste water. The feed rate of the oxygen-containing gas is determinable from the theoretical amount of oxygen required for the oxidation of the organic and/or inorganic substances in the waste water and for the decomposition of ammonia to nitrogen. Generally, the oxygen-containing gas is fed in an amount of about 1 to about 1.5 times, preferably about 1.05 to about 1.2 times, the theoretical amount of oxygen. If the absolute amount of oxygen is insufficient when the oxygen-containing waste gas is used, the gas is replenished with oxygen by supplying air, oxygen-enriched air or oxygen per se. The oxygen-containing gas may be fed to the reactor at a single level or in two or more levels via branched lines. For efficient use of oxygen, the gas flowing out from the reactor can be circulated for use when economical and advantageous to the operation.

The reaction is carried out at a temperature of usually about 100° to about 370° C., preferably about 200° to about 300° C. The higher the reaction temperature, the higher the efficiency of removal of ammonia, organic and/or inorganic substances and the shorter the residence time of the waste water within the reactor but the higher the equipment cost. Accordingly, the reaction temperature is determined in view of the kind of the waste water, the degree of treatment desired and operation and installation costs combined. The reaction pressure therefore needs only to be such that the waste water can at least retain its liquid phase at the predetermined temperature although higher temperatures result in more efficient removable of ammonia.

This invention will be described below in greater detail with reference to the accompanying drawings, in which.

Figure 1:
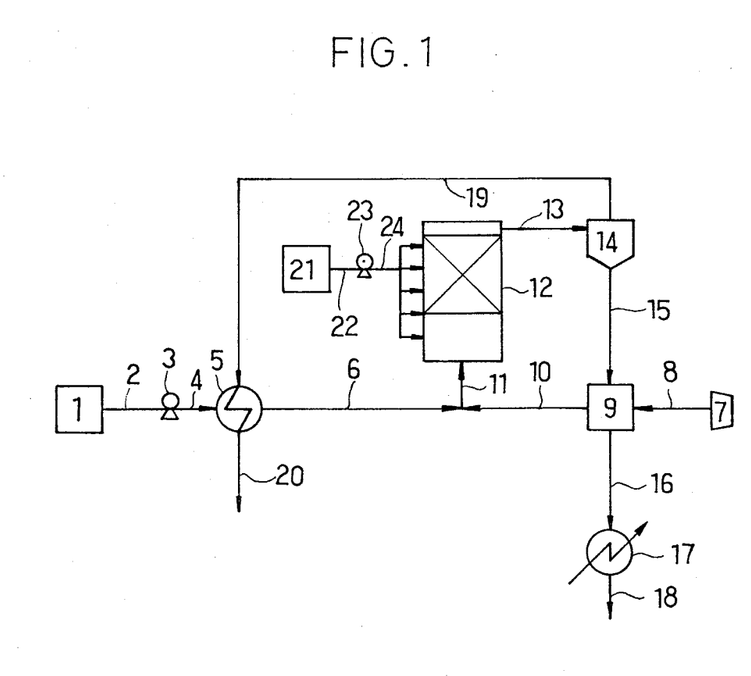
FIG. 1 is a flow diagram illustrating one mode of the process of this invention in which a fixed bed is used.
Figure 2:
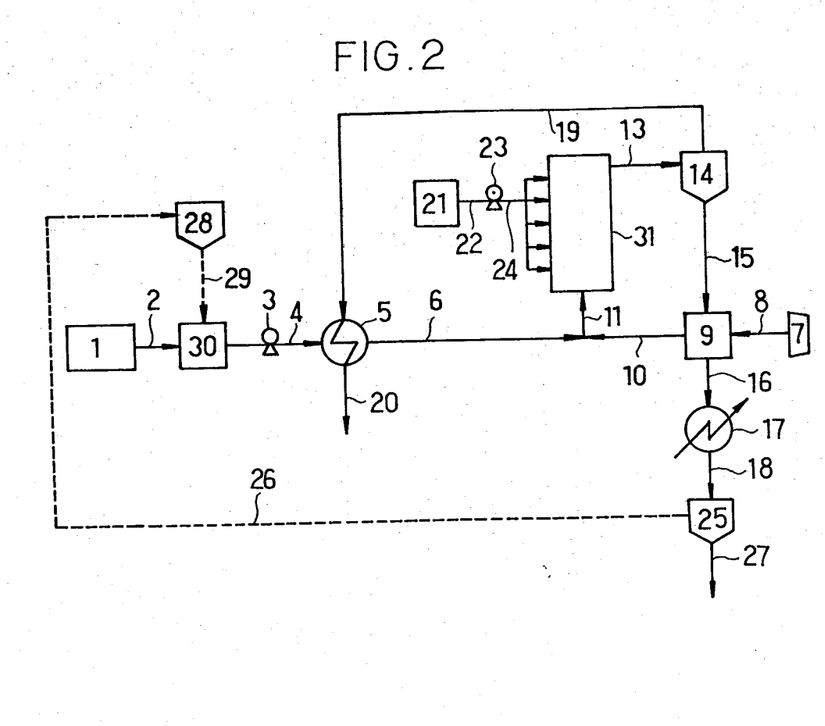
FIG. 2 is a flow diagram illustrating another mode of the present process in which a fluidized bed is used and the recovered catalyst is circulated for reuse.

Throughout FIGS. 1 and 2, like parts are referred to by like reference numerals.

With reference to FIG. 1, waste water is supplied from a tank 1 through a line 2 to a pump 3, by which the water is pressurized to a predetermined pressure level. The water is then led through a line 4, a heat exchanger 5 and a line 6, mixed with an oxygen-containing gas and admitted via a line 11 to a reactor 12 filled with a catalyst. As already described, the pH of the waste water is adjusted with an alkali depending on the kind of the waste water. The alkali can be added to the water at one or more portions of the tank 1, lines 2, 4, 6 and 11.

The oxygen-containing gas, pressurized by a compressor 7, is passed through a line 8, a humidifier 9 and a line 10, mixed with the waste water as stated above and fed to the reactor 12 through the line 11. It is preferable, but not critical, to use the humidifier which serves to prevent the evaporation of the water within the reactor and to achieve an improved heat recovery efficiency. However, when an oxygen-containing waste gas is used as the oxygen source the humidifier is not used to prevent the transfer of harmful components from the waste gas to the treated water. For an improved liquid-gas contact efficiency and increased reaction efficiency in the reactor 12, it is advantageous to finely divide the gas bubbles in the stream of mixed water and gas. Methods of dividing such bubbles are disclosed for example in Japanese Patent Application Disclosures Nos. 49873/1974 and 49874/1974 incorporated by reference herein. The oxygen-containing gas may be added to the waste water at the outlet of the pump 3 or partially introduced directly into the reactor 12 at a single level or as divided at two or more levels. When required, the waste water may be heated at the line 6 or at a lower portion of the reactor 12. However, when the required amount of heat can be provided by the heat of reaction, the waste water need not be heated. When heating is resorted to, the waste water, while flowing through the line 6, may be heated in an unillustrated oven or by heat exchange with a heat medium. Alternatively, the water may be subjected to heat exchange with a heat medium at a lower portion of the reactor.

An alkali substance, which is usually in the form of an aqueous solution, is supplied from an alkali tank 21 via a line 22, a pump 23 and a line 24 to the reactor 12 at such a rate as to maintain at least about 80% of the waste water supplied to the reactor and positioned toward the reactor bottom at a pH of at least about 8 at all times and to permit the water run off from the reactor through a line 13 to retain a pH of about 5 to about 8. Since the pH of the waste water decreases as the water ascends the interior of the reactor 12 with the progress of the reaction, the pH of the water is measured by known means at a plurality of levels as positioned at a constant spacing over the distance of about 80% of the entire length of the reactor from its bottom, so that the alkali substance is supplied at the level where a reduction of the pH to about 8 has been detected. Depending on the reaction conditions, therefore, a line 24 may be branched into a plurality of lines for supplying the alkali substance at two or more levels with the progress of the reaction.

After the waste water has reacted with the oxygen in the gas under the specified conditions within the reactor 12, the resulting mixture is run off from an upper portion of the reactor 12 through a line 13 and conducted to a liquid-gas separation drum 14, in which the mixture is separated into a gas and a liquid.

The treated water flowing out from the separation drum 14 may be admitted to the humidifier 9 by way of a line 15, partly entrained in the oxygen-containing gas and sent to the reactor 12 through the lines 10 and 11. The remainder of the treated water drawn off from the humidifier 9 is passed through a line 16 to a cooler 17, cooled and decompressed to the atmospheric pressure and is released from a line 18. When the oxygen-containing gas includes harmful components such as ammonia, hydrogen sulfide, hydrogen cyanide, etc., the humidifier is not used as stated above.

The gas egressing from the separation drum 14 is sent through a line 19 to the heat exchanger 5, in which the gas gives heat to the waste water, then decompressed to the atmospheric pressure and run off through a line 20. Alternatively, the liquid-gas mixture drawn off from the reactor 12 may be led directly to the heat exchanger 5 and thereafter separated into a gas and a liquid in the separation drum 14.

With reference to FIG. 2, waste water is sent from a tank 1 into a mixer tank 30, in which the water is mixed with a catalyst from a container 28 through a line 29 into a slurry. The slurry is pressurized to a predetermined pressure level by a pump 3 and, in the same manner as in FIG. 1, is thereafter led through a line 4, a heat exchanger 5 and lines 6, 11 to a reactor 31 containing no catalyst. An oxygen-containing gas may usually be fed to the reactor in the same manner as in FIG. 1. To fluidize the slurry to a greater extent, part of the gas can be fed directly to the reactor 31 via at least one line branching from a line 10. As in the embodiment of FIG. 1, an aqueous alkali solution is supplied from a tank 21 to the reactor 31 through a line 22, pump 23 and line 24 at a rate suitable to maintain at least about 80% of the waste water introduced to the reactor and positioned toward the waste water inlet of the reactor at a pH of at least about 8 at all times and to permit the treated water to retain a pH of about 5 to about 8.

The highly pressurized treated water containing the catalyst is sent through a line 13, liquid-gas separator 14, line 15, humidifier 9, line 16, cooler 17 and line 18 to a liquid-solid separator 25 such as filter press. The separated liquid is drawn off from a line 27 after decompression to the atmospheric pressure. The catalyst recovered is returned through a line 26 to the container 28 and circulated for use. When an oxygen-containing waste gas is used as the oxygen source, the humidifier 9 is not used as in the case of FIG. 1.

The waste water treated by the process of this invention contains little or no ammonia or COD components, or the concentrations thereof have been reduced to such an extent that the treated water is directly disposable. Furthermore, the gas and the liquid separated after the treatment are substantially free from nitrogen oxides. Even when a waste gas is used as the oxygen source, the gas and liquid after the reaction are substantially free of the harmful components contained in the waste gas. The treated water with a pH of about 5 to about 8 appears almost colorless and transparent and is very advantageously reusable for example for industrial applications as it is or when further treated by the reverse osmosis process, the ion exchange process or the like if the water contains sodium sulfate or the like derived from sulfur compounds.

In contrast with the present process, known processes require many steps and are costly. For example, the gas liquor produced in coke ovens in the manufacture of coke is usually treated by the successive steps of (1) removal of phenol, (2) pretreatment, (3) removal of ammonia by stripping, (4) treatment with activated sludge and (5) coagulation and sedimentation, which may further be followed by the steps of (6) oxidation with chemical, (7) adsorption with active carbon and (8) reverse osmosis, when required. The process of this invention consists essentially of a single step in which the gas liquor from the coke oven is fed directly to a reactor on pressurization without being cooled and catalytically oxidized with an oxygen-containing gas, whereby the ammonia and COD components (such as phenol, cyanides, thiocyanates, oils, thiosulfuric acid, sulfurous acid, sulfides, etc.) contained in the gas liquor can all be decomposed and rendered harmless. Thus the present process involves a greatly simplified operation which can be conducted at an exceedingly reduced overall cost (equipment cost and operation cost).

The process of this invention has overcome the problems encountered with the process of the prior invention when the waste water is fed at a pH of about 9 to about 11.5. The supply of an alkali substance mitigates the marked decrease of pH that takes place in the prior art within the reactor, thereby preventing the reduction of the decomposition efficiency, the degradation of the catalyst and the damage to the reactor, heat exchanger, piping system, etc.

While high-temperature and high-pressure conditions employed for treating waste water at a pH of higher than 11 are likely to permit the carrier to dissolve out or give a large quantity of nitrite and/or nitrate nitrogen, the use of the titania and/or zirconia for the carrier precludes such objection.

The combination of the step of purifying a gas containing ammonia and COD components, such as hydrogen cyanide and hydrogen sulfide, and the step of treating waste water by wet oxidation greatly faciliates removal of such pollutants from the waste liquid resulting from the gas purifying step and heretofore considered difficult to treat.

For a better understanding of this invention, examples will be given below.

EXAMPLE 1

The process of this invention is continuously practiced for 4,000 hours in the mode shown in FIG. 1.

A gas liquor (pH about 9.5) obtained from a coke oven is fed to a lower portion of a cylindrical stainless steel reactor at a space velocity of 0.99 hr$^{-1}$ (based on an empty column). The mass velocity of the liquor is 3.45 t/m$^2$·hr. Air is introduced into the lower portion of the reactor at a space velocity of 50.8 hr$^{-1}$ (based on an empty column, under standard conditions). The reactor is filled with a catalyst in the form of pellets 5 mm in diameter and composed of 2.0% by weight of ruthenium supported on titania. The interior of the reactor is maintained at a temperature of 275° C. and pressure of 75 kg/cm$^2$G, while supplying a 48% aqueous solution of caustic soda to the reactor at a rate required to maintain the portion of the water filling the reactor to 80% of the length thereof from its bottom at a pH of at least 8.5 at all times and to permit the water resulting from the wet oxidation to retain a pH of about 7.5. The liquid-gas mixture resulting from the catalytic reaction is continuously drawn off from an upper portion of the reactor, and then led to a liquid-gas separator to separate into a liquid and gas, which are indirectly cooled and taken out of the system respectively.

The gas phase obtained 4,000 hours after the start of the operation is found to contain 0.5 ppm of ammonia and 0.01 ppm of nitrogen oxides, the remainder being nitrogen, oxygen and carbon dioxide, but none of sulfur oxides, hydrogen sulfide and hydrogen cyanide are detected.

Table 1 shows the quality of the liquid phase and the amount of dissolved-out catalyst carrier as determined upon lapse of 4,000 hours after the start of the operation.

After the lapse of 4,000 hours, the reactor is divided vertically into two, and the inner surface thereof is checked for with the unaided eye, but substantially no corrosion is found.

COMPARISON EXAMPLE 1

The same procedure as in Example 1 is repeated except that α-alumina is used as the catalyst carrier in place of titania and the 48% caustic soda solution is not supplied to the reactor.

The gas phase obtained 4,000 hours after the start of the operation is found to contain 5.0 ppm of ammonia and 0.6 ppm of nitrogen oxides, the remainder being nitrogen, oxygen and carbon dioxide, but none of sulfur oxides, hydrogen sulfide and hydrogen cyanide are detected.

Table 1 shows the quality of the liquid phase and the amount of dissolved-out catalyst carrier as determined upon lapse of 4,000 hours after the start of the operation.

The reactor used for 4,000 hours is divided vertically into two, and the inner surface thereof is checked for with the unaided eye to find corrosion pits in various portions. A microscopic observation reveals that some of the pits have developed into transcrystalline cracks.

COMPARISON EXAMPLE 2

Waste water is continuously treated for 4,000 hours in the same manner as in Example 1 except that α-alumina is used as the catalyst carrier in place of titania.

The gas phase obtained 4,000 hours after the start of the operation is found to contain 2.5 ppm of ammonia and 0.03 ppm of nitrogen oxides, the remainder being nitrogen, oxygen and carbon dioxide, but none of sulfur oxides, hydrogen sulfide and hydrogen cyanide are detected.

Table 1 shows the quality of the liquid phase and the amount of dissolved-out catalyst carrier as determined upon lapse of 4,000 hours after the start of the operation.

Substantially no corrosion is found on the inner surface of the reactor after lapse of 4,000 hours.

TABLE 1

| | Example 1 | | Comp. Ex. 1 | | Comp. Ex. 2 | |
| --- | --- | --- | --- | --- | --- | --- |
| | Quality of treated water (ppm) | Removal (%) | Quality of treated water (ppm) | Removal (%) | Quality of treated water (ppm) | Removal (%) |
| COD | 15.0 | At least | 23.0 | At least | 20.9 | At least |

TABLE 1-continued

|  | Example 1 | | Comp. Ex. 1 | | Comp. Ex. 2 | |
| --- | --- | --- | --- | --- | --- | --- |
|  | Quality of treated water (ppm) | Removal (%) | Quality of treated water (ppm) | Removal (%) | Quality of treated water (ppm) | Removal (%) |
| Total NH₃ | 1.5 | 99 At least 99 | 48.0 | 99 98.3 | 1.9 | 99 At least 99 |
| TN* | 5.0 | At least 99 | 45.0 | 98.4 | 10.4 | At least 99 |
| TOD** | 29.5 | At least 99 | 175.4 | 98.9 | 46.0 | At least 99 |
| TOC*** | 20.0 | 98.6 | 41.0 | 97.1 | 25.0 | 98.3 |
| pH | 7.2 | — | 2.8 | — | 7.5 | — |
| Concn. of dissolved-out Al or Ti | None detected | — | 19.0 | — | 0.9 | — |
| SO₄ concn. | 1500 | — | 1340 | — | 1500 | — |

*Total nitrogen
**Total oxygen demand
***Total organic carbon

Based on the concentration of dissolved-out Ti or Al listed in Table 1, the ratio of the amount of the carrier dissolved-out to the amount of the carrier originally used is 0.00% in Example 1, 21.3% in Comparison Example 1 and 0.96% in Comparison Example 2.

COMPARISON EXAMPLE 3

Waste water is continuously treated for 4,000 hours in the same manner as in Example 1 except that silica is used as the catalyst carrier in place of titania.

The gas phase obtained 4,000 hours after the start of the operation is found to contain 5.0 ppm of ammonia and 0.08 ppm of nitrogen oxides, the remainder being nitrogen, oxygen and carbon dioxide, but none of sulfur oxides, hydrogen sulfide and hydrogen cyanide are detected.

Table 2 shows the quality of the liquid phase and the amount of dissolved-out catalyst carrier as determined upon lapse of 4,000 hours after the start of the operation.

After the lapse of 4,000 hours, substantially no corrosion is found on the inner surface of the reactor.

COMPARISON EXAMPLE 4

Waste water is continuously treated for 4,000 hours in the same manner as in Example 1 except that silica-alumina is used as the catalyst carrier in place of titania.

The gas phase obtained 4,000 hours after the start of the operation is found to contain 5.2 ppm of ammonia and 0.10 ppm of nitrogen oxides, the remainder being nitrogen, oxygen and carbon dioxide, but none of sulfur oxides, hydrogen sulfide and hydrogen cyanide are detected.

Table 2 shows the quality of the liquid phase and the amount of dissolved-out catalyst carrier as determined upon lapse of 4,000 hours after the start of the operation.

The inner surface of the reactor after the lapse of 4,000 hours is found to be substantially free of corrosion.

TABLE 2

|  | Comp. Ex. 3 | | Comp. Ex. 4 | |
| --- | --- | --- | --- | --- |
|  | Quality of treated water (ppm) | Removal (%) | Quality of treated water (ppm) | Removal (%) |
| COD | 48.0 | 98.9 | 59.1 | 98.7 |
| Total NH₃ | 98.2 | 97.1 | 118.7 | 96.5 |
| TN | 95.0 | 96.7 | 125.0 | 95.6 |
| TOD | 329 | 97.9 | 408 | 97.4 |
| TOC | 51.0 | 96.4 | 63.2 | 95.6 |
| pH | 7.4 | — | 7.2 | — |
| Concn. of dissolved-out carrier | Si:43.5 | — | Al:20.0 Si:41.0 | — |
| SO₄ concn. | 1280 | — | 1100 | — |

Based on the concentration of dissolved-out carrier listed in Table 2, the ratio of the amount of the carrier dissolved out to the amount of the carrier originally used amounts to 38.7% in Comparison Example 3, and 18.3% of Al and 37.4% of Si in Comparison Example 4.

EXAMPLE 2

The process of the invention is practiced in the mode shown in FIG. 1.

A gas liquor obtained from a coke oven and an effluent from a wet desulfurization process of the sulfur recovery type are mixed together in a ratio of 5:1, and the combined waste water is adjusted to a pH of about 10 with a caustic soda solution and then fed to a lower portion of a reactor at a space velocity of 1.73 hr$^{-1}$ (based on an empty column). The mass velocity of the water is 5.20 t/m$^2$·hr. Air is introduced into the lower portion of the reactor at a space velocity of 244 hr$^{-1}$ (based on an empty column, under standard conditions). The reactor is filled with a catalyst in the form of balls about 5 mm in diameter and composed of 1.5% by weight of palladium supported on a titania carrier.

The interior of the reactor is maintained at a temperature of 265° C. and pressure of 80 kg/cm$^2$G, while supplying a 48% aqueous solution of caustic soda to the reactor at a rate required to maintain the portion of the water filling the reactor to 80% of the length thereof from its bottom at a pH of at least about 8.5 at all times and to permit the water resulting from the wet oxidation to retain a pH of about 8.0. The liquid-gas mixture resulting from the catalytic wet oxidation reaction is continuously drawn off from an upper portion of the reactor, then led to a liquid-gas separator and separated into a liquid and gas, which are indirectly cooled and run off from the system respectively.

The gas phase is found to contain 0.8 ppm of ammonia and 0.02 ppm of nitrogen oxides, the remainder being nitrogen, oxygen and carbon dioxide, but none of sulfur oxides, hydrogen sulfide and hydrogen cyanide are detected.

Table 3 shows the quality of the waste water mixture and the treated water.

COMPARISON EXAMPLE 5

The same waste water as treated in Example 2 is treated at the same temperature and pressure as used in Example 2 using a catalyst comprising 1.5 wt. % of palladium supported on an α-alumina carrier and without supplying any caustic soda solution to the reactor to obtain treated water of the same quality as in Example 2. The waste water and air must then be fed at the following, greatly altered velocities.

Space velocity of waste water: 0.95 hr$^{-1}$ (based on an empty column)

Mass velocity of waste water: 5.20 t/m$^2$·hr (same as in Example 2)

Space velocity of air: 133 hr$^{-1}$ (based on an empty column, under standard conditions)

The amount of catalyst needed in Comparison Example 5 is found to be about 182, based on that used in Example 2 which is assumed to be 100. Thus Comparison Example 5 requires an exceedingly larger amount of catalyst than Example 2. This indicates that Comparison Example 5 is much more disadvantageous than Example 2.

The pH of the treated water is as low as about 2.8, while the concentration of dissolved-out Al is as high as 25 mg/l.

COMPARISON EXAMPLE 6

Waste water is treated in the same manner as in Example 2 except that α-alumina is used as the carrier in place of titania.

The gas phase is found to contain nitrogen, oxygen, carbon dioxide, 1.5 ppm of ammonia and 0.04 ppm of nitrogen oxides but none of sulfur oxides, hydrogen sulfide and hydrogen cyanide are detected.

Table 3 shows the quality of the treated water.

TABLE 3

|  | Quality of combined waste water (ppm) | Example 2 Quality of treated water (ppm) | Example 2 Removal (%) | Comp. Ex. 6 Quality of treated water (ppm) | Comp. Ex. 6 Removal (%) |
| --- | --- | --- | --- | --- | --- |
| COD | 20,000 | 45 | At least 99 | 101 | At least 99 |
| Total NH$_3$ | 10,000 | 9 | At least 99 | 27 | At least 99 |
| Nitrite and nitrate nitrogen | 300 | 0.7 | At least 99 | 50 | 83.3 |
| TOD | 44,000 | 245 | At least 99 | 425 | 99.0 |
| TC* | 2,000 | 150 | 92.5 | 245 | 87.8 |
| TOC | 1,500 | 20 | 98.7 | 94 | 93.7 |
| TN | 8,800 | 9 | At least 99 | 79 | At least 99 |
| Concn. of dissolved-out Al or Ti | — | None detected | — | 1.4 | — |

*Total carbon

EXAMPLE 3

The process of this invention is practiced in the mode shown in FIG. 2 for treating a gas liquor obtained from a coke oven and containing phenol, ammonium thiocyanate, ammonium thiosulfate, ammonium nitrite, ammonium nitrate, ammonium carbonate and ammonia, as combined with waste water resulting from a coke oven gas purifying process and containing hydrogen cyanide, hydrogen sulfide, ammonia and a very small amount of naphthalene, in a ratio of 2 parts of the former to 1 part of the latter. A particulate catalyst 0.15 to 0.3 mm in particle size and comprising 5% by weight of ruthenium supported on zirconia is admixed with the combined waste water to prepare a slurry containing 10% by weight of the catalyst. The slurry is adjusted to a pH of 10.5 with a calcium hydroxide solution and then fed to a cylindrical stainless steel reactor at a space velocity of 1.73 hr$^{-1}$ (based on an empty column) and at a mass velocity of 5.18 t/m$^2$·hr. Air is introduced to the reactor at a space velocity of 66.1 hr$^{-1}$ (based on an empty column, under standard conditions).

The interior of the reactor is maintained at a temperature of 250° C. and pressure of 60 kg/cm$^2$G, while supplying a 48% aqueous solution of caustic soda to the reactor at a rate required to maintain the portion of the water filling the reactor to 80% of the length thereof from its bottom at a pH of at least 8.5 at all times and to permit the water resulting from the wet oxidation to retain a pH of about 7.3. The liquid-gas mixture resulting from the catalytic wet oxidation reaction is continuously drawn off from an upper portion of the reactor, indirectly cooled and led into a liquid-gas separator, in which the mixture is separated into a liquid and a gas. The separated gas is decompressed to the atmospheric pressure and then released to the atmosphere. The liquid phase is decompressed to the atmospheric pressure, led to a liquid-solid separator and separated into the catalyst and treated water for the recovery of the catalyst. The separated gas phase is found to contain 2.2 ppm of ammonia and 0.02 ppm of nitrogen oxides, the remainder being nitrogen, oxygen and carbon dioxide, whereas neither sulfur oxides nor hydrogen sulfide is detected.

Table 4 shows the quality of the combined waste water and the treated water.

TABLE 4

|  | Quality of combined waste water (ppm) | Quality of treated water (ppm) | Removal (%) |
| --- | --- | --- | --- |
| COD | 3,500 | 10 | At least 99 |
| Total NH$_3$ | 4,000 | 2.8 | At least 99 |
| Nitrite and nitrate nitrogen | 200 | 3.0 | 98.5 |
| TOD | 12,700 | 23 | At least 99 |
| TC | 1,700 | 150 | 91.2 |
| TOC | 1,100 | 18 | 98.4 |
| TN | 3,500 | 15 | At least 99 |
| SO$_4$ | 105 | 1046 | — |
| Concn. of dissolved-out Zr | — | None detected | — |

EXAMPLES 4 TO 19

Waste water is treated in the same manner as in Example 2 except that the catalyst listed in Table 5 is used in each example. Table 5 also shows the COD removal efficiency and ammonia removal efficiency achieved in each example, as well as the pH of the treated water. No carrier metal is found to dissolve out.

The gas phase is found to contain up to 2.5 ppm of ammonia and up to 0.5 ppm of nitrogen oxides, the remainder being nitrogen, oxygen and carbon dioxide, but none of sulfur oxides, hydrogen sulfide and hydrogen cyanide are detected.

TABLE 5

| Example | Catalyst | COD removal (%) | Ammonia removal (%) | pH of treated water |
|---|---|---|---|---|
| 4 | 1.0% Ir—$TiO_2$ | 99 | At least 99 | 6.2 |
| 5 | 0.3% Pt—$TiO_2$ | At least 99 | At least 99 | 7.1 |
| 6 | 1.0% Au—$TiO_2$ | 99 | 98 | 7.2 |
| 7 | 0.5% Pd—$TiO_2$ | At least 99 | At least 99 | 6.9 |
| 8 | 1.0% Rh—$ZrO_2$ | 95 | 93 | 6.9 |
| 9 | 5.0% Fe—$TiO_2$ | 97 | 97 | 7.3 |
| 10 | 5.0% Ni—$TiO_2$ | 92 | 98 | 6.2 |
| 11 | 5.0% W—$TiO_2$ | 91 | 93 | 6.3 |
| 12 | 5.0% Cu—$TiO_2$ | 99 | 93 | 6.8 |
| 13 | 5.0% Co—$TiO_2$ | 97 | 98 | 6.3 |
| 14 | 5.0% $Fe_2O_3$—$TiO_2$ | 92 | 95 | 6.9 |
| 15 | 5.0% $Fe_3O_4$—$TiO_2$ | 92 | 91 | 7.1 |
| 16 | 2.0% Pd—$TiO_2$ | At least 99 | At least 99 | 7.2 |
| 17 | 2.0% Pt—$TiO_2$ | At least 99 | At least 99 | 7.1 |
| 18 | 2.0% $RuCl_2$—$TiO_2$ | 91 | 96 | 7.5 |
| 19 | 5.0% CoO—$TiO_2$ | 91 | 95 | 7.5 |

EXAMPLES 20 TO 24

The process of the invention is practiced in the mode shown in FIG. 1.

A gas liquor (pH 9.5) obtained from a coke oven is subjected to wet oxidation in the same manner as in Example 1 except that the liquor is adjusted to a pH of 10.5 with a caustic soda solution and then treated with use of the temperature, pressure and catalyst listed in Table 6 for each example.

Table 6 also shows the ammonia removal efficiency achieved in each example.

TABLE 6

| Example | Temp. (°C.) | Pressure (kg/cm²G) | Ammonia removal efficiency (%) 2% Pd—$TiO_2$ | Ammonia removal efficiency (%) 1% Pt—$ZrO_2$ |
|---|---|---|---|---|
| 20 | 100 | 10 | 90 | 93 |
| 21 | 150 | 20 | 95 | 98 |
| 22 | 200 | 30 | At least 99 | At least 99 |
| 23 | 250 | 45 | At least 99 | At least 99 |
| 24 | 280 | 75 | At least 99 | At least 99 |

EXAMPLES 25 TO 28

The process of the invention is practiced in the mode shown in FIG. 1.

A mixture (pH 8.2) of a gas liquor obtained from a coke oven and waste water resulting from a wet desulfurization process of the sulfur recovery type is first adjusted to the pH listed in Table 7 with a caustic soda solution, and is thereafter subjected to wet oxidation in the same manner as in Example 2. Table 7 also shows the ammonia removal efficiency achieved in each example, as well as the pH of the treated water.

TABLE 7

| Example | pH of waste water mixture | Ammonia removal efficiency (%) | pH of treated water |
|---|---|---|---|
| 25 | 8.5 | 97 | 7.5 |
| 26 | 9.0 | At least 99 | 7.9 |
| 27 | 10.0 | At least 99 | 7.5 |
| 28 | 11.0 | At least 99 | 7.8 |

EXAMPLE 29

The process of this invention is practiced in the same mode as shown in FIG. 1 except that the humidifier 9 is not used.

A gas liquor obtained from a coke oven is adjusted to a pH of 11.0 with a caustic soda solution and then fed to a lower portion of a reactor at a space velocity of 0.99 $hr^{-1}$ (based on an empty column). The mass velocity of the water is 3.45 t/m²·hr. Air containing 2 g/Nm³ of hydrogen sulfide, 4 g/Nm³ of ammonia and 0.1 g/Nm³ of hydrogen cyanide is introduced into the lower portion of the reactor at a space velocity of 44.4 $hr^{-1}$ (based on an empty column, under standard conditions). The reactor has charged therein a catalyst in the form of balls about 4 mm in diameter and composed of 2.0% by weight of palladium supported on titania.

The interior of the reactor is maintained at a temperature of 250° C. and pressure of 55 kg/cm² G, while supplying a 48% aqueous solution of caustic soda to the reactor at a rate required to maintain the portion of the water filling the reactor to 80% of the length thereof from its bottom at a pH of at least 8.5 at all times and to permit the water resulting from the wet oxidation to retain a pH of about 7.5. The liquid-gas mixture resulting from the catalytic reaction is continuously drawn off from an upper portion of the reactor and then led into a liquid-gas separator. The gas phase obtained 4,000 hours after the start of the operation is found to contain 0.5 ppm of ammonia and 0.01 ppm of nitrogen oxides, the remainder being nitrogen, oxygen and carbon dioxide, but none of sulfur oxides, hydrogen sulfide and hydrogen cyanide are detected. Table 8 below shows the quality of treated water obtained 4,000 hours after the start of the treatment.

COMPARISON EXAMPLE 7

The gas liquor is continuously treated in the same manner as in Example 29 except that α-alumina is used as the catalyst carrier in place of titania.

The quality of treated water obtained 4,000 hours after the start of the treatment is given in Table 8 below.

TABLE 8

| | Example 29 | | | Comp. Ex. 7 | |
|---|---|---|---|---|---|
| | Quality of gas liquor (ppm) | Quality of treated water (ppm) | Removal (%) | Quality of treated water (ppm) | Removal (%) |
| COD | 4,000 | 10 | At least 99 | 18 | 99.6 |
| Total $NH_3$ | 5,000 | 2.5 | At least 99 | 5.0 | At least 99 |

TABLE 8-continued

| | Example 29 | | | Comp. Ex. 7 | |
|---|---|---|---|---|---|
| | Quality of gas liquor (ppm) | Quality of treated water (ppm) | Removal (%) | Quality of treated water (ppm) | Removal (%) |
| Nitrite and nitrate nitrogen | 60 | 0.8 | 98.7 | 1021 | — |
| TOD | 16,000 | 20 | At least 99 | 69 | At least 99 |
| TC | 2,200 | 175 | 92.0 | 190 | 91.4 |
| TOC | 1,500 | 15 | 99 | 34 | 97.7 |
| TN | 4,700 | 4 | At least 99 | 1030 | 78.1 |
| Concn. of dissolved-out carrier | — | None detected | — | 1.1 | — |

EXAMPLE 30

The process of this invention is practiced in the same mode as shown in FIG. 2 except that the humidifier 9 is not used.

With a gas liquor (pH 9.2) obtained from a coke oven is admixed a particulate catalyst 0.15 to 0.3 mm in particle size and comprising 5% by weight of ruthenium supported on titania to prepare a slurry, which is fed to a cylindrical stainless steel reactor at a space velocity of 1.51 hr$^{-1}$ (based on an empty column) and at a mass velocity of 4.53 t/m$^2$·hr. Air containing 5 g/Nm$^3$ of hydrogen sulfide is introduced to the reactor at a space velocity of 72.4 hr$^{-1}$ (based on an empty column, under standard conditions).

The interior of the reactor is maintained at a temperature of 250° C. and pressure of 60 kg/cm$^2$G, while supplying an aqueous solution of caustic soda to the reactor at a rate required to maintain the water filling the reactor at a pH of at least 8.5 and to permit the water resulting from the wet oxidation to retain a pH of about 6.5. The liquid-gas mixture resulting from the catalytic wet oxidation reaction is continuously drawn off from an upper portion of the reactor, indirectly cooled and led into a liquid-gas separator, in which the mixture is separated into a liquid and a gas. The separated gas is decompressed to the atmospheric pressure and then released to the atmosphere. The liquid phase is decompressed to the atmospheric pressure, led to a liquid-solid separator and separated into the catalyst and treated water for the recovery of the catalyst. The separated gas phase is found to contain 1.0 ppm of ammonia and 0.02 ppm of nitrogen oxides, the remainder being nitrogen, oxygen and carbon dioxide, whereas neither sulfur oxides nor hydrogen sulfide is detected.

Table 9 shows the quality of the waste water and the treated water.

TABLE 9

| | Quality of gas liquor (ppm) | Quality of treated water (ppm) | Removal (%) |
|---|---|---|---|
| COD | 4,000 | 6.9 | At least 99 |
| Total NH$_3$ | 5,000 | 0.3 | At least 99 |
| Nitrite and nitrate nitrogen | 300 | 0.3 | At least 99 |
| TOD | 16,000 | 20 | At least 99 |
| TC | 2,200 | 120 | 94.5 |
| TOC | 1,500 | 15 | 99 |
| TN | 4,700 | 1.9 | At least 99 |

We claim:

1. A process for treating ammonia-containing waste water which comprises introducing at a pH of about 8.5 to about 11.5 the waste water to a reactor to subject the same to wet oxidation with an oxygen-containing gas in the presence of a catalyst while maintaining the waste water at a temperature of about 100° to about 370° C. and at pressure permitting the waste water to remain in the liquid phase, the oxygen-containing gas containing oxygen in an amount of about 1 to about 1.5 times the theoretical amount required for decomposing the ammonia, organic substances and inorganic substances contained in the waste water, the catalyst being supported by at least one of zirconia and titania and comprising at least one of iron, cobalt, nickel, ruthenium, rhodium, palladium, iridium, platinum, copper, gold, tungsten and compounds thereof insoluble or sparingly soluble in water, and supplying an alkali substance to the reactor at a rate required to maintain at least about 80% of the waste water introduced to the reactor and positioned toward the water inlet of the reactor at a pH of at least about 8 at all times and to permit the water resulting from the wet oxidation to retain a pH of about 5 to about 8.

2. A process as defined in claim 1 wherein the ammonia-containing waste water is fed into the reactor at a pH of about 9 to about 11.

3. A process as defined in claim 1 wherein the active component of the catalyst comprises at least one of iron, cobalt, nickel, ruthenium, rhodium, palladium, iridium, platinum, copper, gold and tungsten.

4. A process as defined in claim 1 wherein the active component of the catalyst comprises at least one of compounds insoluble or sparingly soluble in water of iron, cobalt, nickel, ruthenium, rhodium, palladium, iridium, platinum, copper, gold and tungsten.

5. A process as defined in claim 4 wherein the active component of the catalyst comprises at least one of oxides of iron, cobalt, nickel, ruthenium, rhodium, palladium, iridium, copper and tungsten.

6. A process as defined in claim 5 wherein the active component of the catalyst comprises at least one of iron sesquioxide, tri-iron tetroxide, cobalt monoxide, nickel monoxide, ruthenium dioxide, rhodium sesquioxide, palladium monoxide, iridium dioxide, cupric oxide and tungsten dioxide.

7. A process as defined in claim 4 wherein the active component of the catalyst comprises at least one of ruthenium dichloride and platinum dichloride.

8. A process as defined in claim 4 wherein the active component of the catalyst comprises at least one of ruthenium sulfide and rhodium sulfide.

9. A process as defined in claim 1 wherein the wet oxidation of the waste water is carried out in a reactor of the fixed bed type.

10. A process as defined in claim 1 wherein the wet oxidation of the waste water is carried out in a reactor of the fluidized bed type.

11. A process as defined in claim 1 wherein the oxygen-containing gas is fed in an amount about 1.05 to about 1.2 times the required theoretical amount of oxygen.

12. A process as defined in claim 1 wherein the reaction is carried out at a temperature of about 200° to about 300° C.

* * * * *